Nov. 27, 1928.
C. T. PFLUEGER
1,693,566
FISH SCALER
Filed Feb. 23, 1926
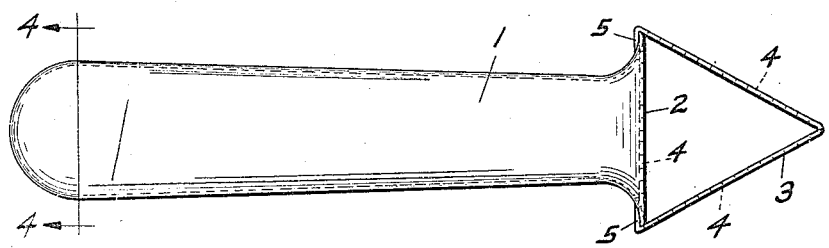
FIG.-1
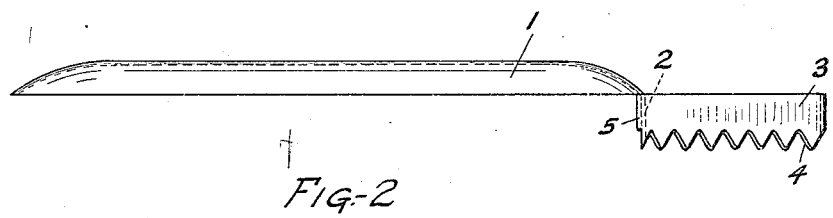
FIG.-2
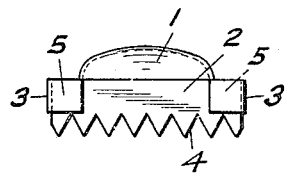 
FIG.-3    FIG.-4
INVENTOR.
CHARLES T. PFLUEGER
BY
ATTORNEY.

Patented Nov. 27, 1928.

1,693,566

UNITED STATES PATENT OFFICE.

CHARLES T. PFLUEGER, OF AKRON, OHIO, ASSIGNOR TO THE ENTERPRISE MANUFACTURING COMPANY, OF AKRON, OHIO, A CORPORATION OF OHIO.

FISH SCALER.

Application filed February 23, 1926. Serial No. 90,013.

This invention relates to a simple hand device or tool for the purpose of scaling fish, being an improvement upon prior devices for this purpose in that it is more efficient and obtains better results than prior tools for this purpose, as it enables the removal of the scales about the fins and other parts of the fish which are not easily accessible with scalers at present on the market.

In the drawings is shown one form of the invention, in which—

Figure 1 is a plan view;

Figure 2 is a side view;

Figure 3 is an end view; and

Figure 4 is a cross-section through the handle on the line 4—4 of Figure 1.

The tool is made from a stamping which forms the handle 1, the body of which is arched slightly to fit the hand. The forward end of the handle is turned downwardly to form a flange 2 to which is welded at 5, an angular piece or strip of metal 3 to form a triangular head. The lower edges of the flange 2 and the strip 3 are provided with a plurality of sharp, pointed teeth 4 which are used to remove the scales.

The device is an improvement over prior forms of fish scalers as the straight edges and sharp angles about the head enable the fisherman to remove the scales about the fins and at other places where a rounded or circular scaler cannot reach.

It is obvious that other shapes may be substituted for the triangular head and accomplish substantially the same results, provided the head has one or more sharp angles and straight edges, but the triangular head is preferred for the reasons of simplicity of manufacture and ease of operation.

What is claimed is:

1. A fish scaler having a handle, one extremity of which is bent downwardly to form a flange, and a strip of metal secured at its ends to the flange to form a head and having teeth along its lower edge, the metal being bent to form a sharp angle.

2. A fish scaler having a handle, one extremity of which is bent downwardly to form a flange, and a triangular head, one side of which is formed by the flange and the remainder by a strip of metal, the ends of which are secured to the flange, the center of the strip being formed with a sharp angle in alignment with the handle, the strip being formed with teeth along its lower edge about the two sides of the head.

CHARLES T. PFLUEGER.